(12) United States Patent
Van Wiemeersch et al.

(10) Patent No.: US 11,044,566 B2
(45) Date of Patent: Jun. 22, 2021

(54) VEHICLE EXTERNAL SPEAKER SYSTEM

(71) Applicant: Ford Global Technologies, LLC, Dearborn, MI (US)

(72) Inventors: John Robert Van Wiemeersch, Novi, MI (US); Stuart C. Salter, White Lake, MI (US); Ross Dykstra Pursifull, Dearborn, MI (US); Paul Kenneth Dellock, Northville, MI (US); Kristopher Karl Brown, Dearborn, MI (US); Joshua Wheeler, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/889,886

(22) Filed: Jun. 2, 2020

(65) Prior Publication Data
US 2020/0396553 A1 Dec. 17, 2020

Related U.S. Application Data

(63) Continuation-in-part of application No. 16/437,121, filed on Jun. 11, 2019, now Pat. No. 10,708,700.

(51) Int. Cl.
*H04R 27/00* (2006.01)
*H04W 4/44* (2018.01)
(Continued)

(52) U.S. Cl.
CPC ......... *H04R 27/00* (2013.01); *G06K 9/00335* (2013.01); *G06K 9/00832* (2013.01); *G06T 7/70* (2017.01); *H04R 3/00* (2013.01); *H04R 29/001* (2013.01); *H04W 4/44* (2018.02); *G06T 2207/30196* (2013.01); *G06T 2207/30252* (2013.01); *G08B 7/06* (2013.01); *H04R 2430/01* (2013.01); *H04R 2499/13* (2013.01)

(58) Field of Classification Search
None
See application file for complete search history.

(56) References Cited

U.S. PATENT DOCUMENTS 10,300,889 B2 * 5/2019 Greenberg ......... G06K 9/00604
2002/0152010 A1 * 10/2002 Colmenarez ......... G06K 9/6293
701/36

(Continued)

FOREIGN PATENT DOCUMENTS

CN 103096186 B 6/2016

*Primary Examiner* — Qin Zhu
(74) *Attorney, Agent, or Firm* — Frank Lollo; Bejin Bieneman PLC

(57) ABSTRACT

A system includes a microphone mounted inside a vehicle, a speaker mounted outside a passenger cabin of the vehicle and directed outside the vehicle, a camera with a field of view encompassing a seat in the passenger cabin of the vehicle, and a computer in communication with the microphone, speaker, and camera. The computer is programmed to, in response to data from the camera indicating a gesture by an occupant of the seat, activate the speaker to broadcast based on data transmitted by the microphone; and prevent the speaker from activating in response to data indicating that a biometric characteristic of a pedestrian outside the vehicle either matches a stored biometric characteristic or fails to match any of a plurality of stored biometric characteristics.

20 Claims, 4 Drawing Sheets

(51) Int. Cl.
  *G06K 9/00* (2006.01)
  *G06T 7/70* (2017.01)
  *H04R 29/00* (2006.01)
  *H04R 3/00* (2006.01)
  *G08B 7/06* (2006.01)
  *G06K 9/62* (2006.01)

(56) References Cited

U.S. PATENT DOCUMENTS

| | | |
|---|---|---|
| 2005/0105299 A1 | 5/2005 | Gilbert et al. |
| 2005/0131607 A1 | 6/2005 | Breed |
| 2008/0273715 A1 | 11/2008 | Snider et al. |
| 2014/0119564 A1 | 5/2014 | Caskey et al. |
| 2014/0303899 A1* | 10/2014 | Fung ................. G06F 19/36 702/19 |
| 2014/0309862 A1* | 10/2014 | Ricci ................. B60R 25/1004 701/36 |
| 2014/0365073 A1 | 12/2014 | Stanek et al. |
| 2015/0256912 A1 | 9/2015 | Nedelman |
| 2015/0293534 A1* | 10/2015 | Takamatsu ........... B60W 50/08 701/28 |
| 2016/0112556 A1 | 4/2016 | Choi |
| 2016/0357262 A1 | 12/2016 | Ansari |
| 2017/0099295 A1* | 4/2017 | Ricci ................... B60W 50/14 |
| 2017/0190336 A1 | 7/2017 | Vijayan et al. |
| 2018/0361937 A1 | 12/2018 | Schmahl et al. |
| 2019/0095069 A1* | 3/2019 | Proctor ............... G08G 1/0175 |
| 2019/0278454 A1 | 9/2019 | Washeleski et al. |
| 2019/0294889 A1* | 9/2019 | Sriram ............... G06K 9/00335 |
| 2019/0332902 A1* | 10/2019 | Gallagher ......... G06K 9/00335 |
| 2019/0370532 A1* | 12/2019 | Soni ........................ G06N 3/08 |
| 2020/0151489 A1* | 5/2020 | Shram ..................... G06N 3/08 |
| 2020/0249764 A1* | 8/2020 | Page ...................... G06F 3/017 |
| 2020/0249822 A1* | 8/2020 | Penilla .................... H04L 67/12 |

\* cited by examiner

VEHICLE EXTERNAL SPEAKER SYSTEM

CROSS-REFERENCE TO RELATED APPLICATION

This application is a continuation-in-part of, and as such claims priority to, U.S. patent application Ser. No. 16/437,121, filed on Jun. 11, 2019, which is hereby incorporated by reference in its entirety.

BACKGROUND

When an occupant of a vehicle wishes to speak with a pedestrian or other person outside the vehicle, the occupant typically rolls down a window of the vehicle. The occupant of the vehicle is thus exposed to the external environment, potential security risks, and potential medical risk from airborne pathogens, dust, or pollution. In this situation, the occupant must rely on the volume of their own voice to catch the attention of the person outside the vehicle and to be understood by the person outside the vehicle.

DETAILED DESCRIPTION

Figure 1:
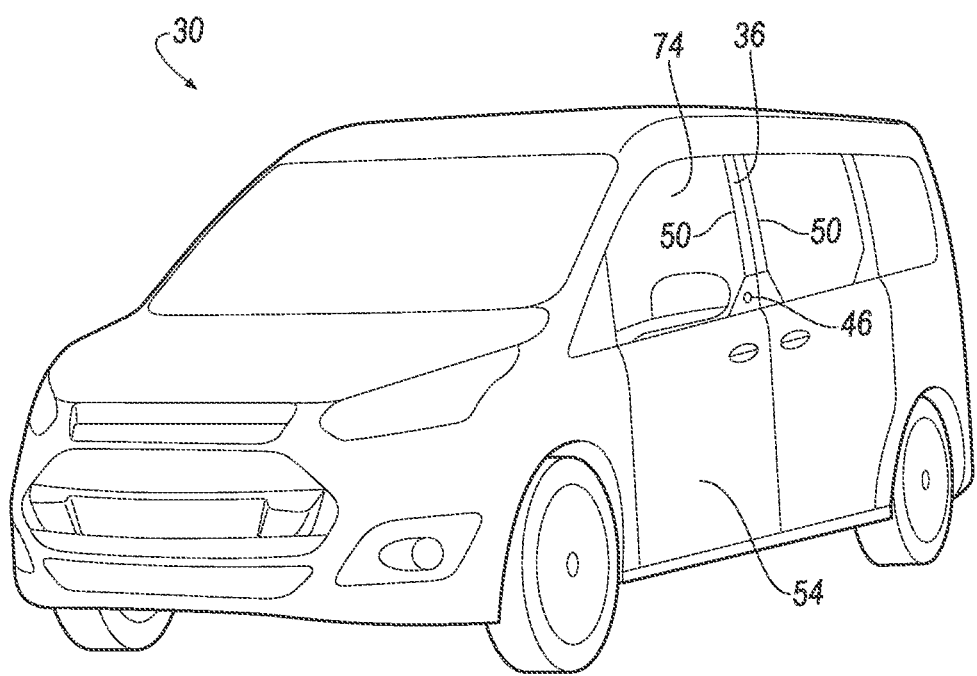
FIG. 1 is a perspective view of an example vehicle.

The speaker system described herein provides a way for an occupant of a vehicle to hold a conversation with a person outside a vehicle without having to roll down the vehicle's windows or having to yell. Moreover, the speaker system operates in an intuitive, automated manner. The occupant can activate the speaker system with little effort, and the occupant can avoid accidentally activating the speaker system when undesirable. The speaker system can be a one-way system from the occupant to the person outside the vehicle, or the speaker system can be two-way, i.e., an intercom system.

A computer includes a processor and a memory storing processor-executable instructions to, in response to data from a camera with a field of view encompassing a seat in a passenger cabin of a vehicle indicating a gesture by an occupant of the seat, activate a speaker mounted outside the passenger cabin and directed outside the vehicle to broadcast based on data transmitted by a microphone mounted inside the vehicle; and prevent the speaker from activating in response to data indicating that a biometric characteristic of a pedestrian outside the vehicle either matches a stored biometric characteristic or fails to match any of a plurality of stored biometric characteristics.

The instructions may further include to store the biometric characteristic of the pedestrian in the memory.

The instructions may further include to instruct the speaker to play a recorded message in response to the data indicating that the biometric characteristic of the pedestrian either matches the stored biometric characteristic or fails to match any of the plurality of stored biometric characteristics.

The biometric characteristic may be one of a face, a fingerprint, or a speech pattern.

The instructions may further include to provide an activation alert upon activating the speaker.

The instructions may further include to, in response to an input from an audio infotainment system of the vehicle, activate the speaker to broadcast based on the data transmitted by the microphone.

The instructions may further include to deactivate the speaker in response to data indicating rolling down a window of the vehicle.

The instructions may further include to deactivate the speaker in response to data indicating increasing a volume of an audio infotainment system of the vehicle.

The instructions may further include to, in response to receiving a V2I message from a source outside the vehicle, activate the speaker to broadcast based on the data transmitted by the microphone.

The instructions may further include to decrease a volume of all or a subpart of media being played by an audio infotainment system of the vehicle upon activating the speaker.

The instructions may further include to adjust a volume level of the speaker based on a difference between the volume level and an external background noise level.

The microphone may be a first microphone, and the instructions may further include to, while the speaker is activated, record sounds detected by the first microphone and detected by a second microphone mounted outside the passenger cabin.

The instructions may further include to prevent the speaker from activating in response to statistical data associated with a location of the vehicle exceeding a threshold.

The instructions may further include to store a wireless ID of a mobile device of the pedestrian outside the vehicle upon activating the speaker.

The instructions may further include to prevent the speaker from activating upon determining that a feature status of a feature of a mobile device of the pedestrian outside the vehicle matches criteria stored in the memory. The feature may be at least one of cellular service, Bluetooth®, Ultra-Wide Band (UWB), or GPS. The criteria may be at least one of (a) the GPS being inactive or (b) the Bluetooth® or UWB being active and the cellular service being inactive.

The speaker may be a first speaker mounted on a first side of the vehicle, and the instructions may further include to activate the first speaker in response to the data from the camera indicating the gesture when the vehicle is closer to a side of a street on the first side of the vehicle, and to activate a second speaker mounted outside the passenger cabin on a second side of the vehicle opposite the first side and directed outside the vehicle in response to the data from the camera indicating the gesture when the vehicle is closer to a side of the street on the second side of the vehicle.

A computer includes a processor and a memory storing processor-executable instructions to, in response to data from a camera with a field of view encompassing a seat in a passenger cabin of a vehicle indicating a gesture by an occupant of the seat, activate a speaker mounted outside the passenger cabin and directed outside the vehicle to broadcast based on data transmitted by a microphone mounted inside the vehicle; and prevent the speaker from activating in response to data indicating that a temperature of a pedestrian outside the vehicle is above a temperature threshold.

A computer includes a processor and a memory storing processor-executable instructions to, in response to data from a camera with a field of view encompassing a seat in a passenger cabin of a vehicle indicating a gesture by an occupant of the seat, activate a speaker mounted outside the passenger cabin and directed outside the vehicle to broadcast based on data transmitted by a microphone mounted inside the vehicle; in response to location data indicating that the vehicle is at a prestored location, activate the speaker to broadcast based on data transmitted by the microphone; and in response to the location data, instruct the speaker to play a recorded message associated with the prestored location.

With reference to the Figures, a system 32 includes an internal microphone 34 mounted inside a vehicle 30, a first external speaker 36 mounted outside a passenger cabin 58 of the vehicle 30 and directed outside the vehicle 30, a camera 38 with a field of view encompassing at least one seat 40, 42 in the passenger cabin 58 of the vehicle 30, and a computer 44 in communication with the internal microphone 34, first external speaker 36, and camera 38. The computer 44 is programmed to, in response to data from the camera 38 indicating a gesture by an occupant of the seat 40, 42, activate the first external speaker 36 to broadcast based on data transmitted by the internal microphone 34.

With reference to FIG. 1, the vehicle 30 may be any passenger or commercial automobile such as a car, a truck, a sport utility vehicle, a crossover, a van, a minivan, a taxi, a bus, etc. The vehicle 30 may be an autonomous vehicle, i.e., including a computer programmed to operate the vehicle independently of the intervention of a human driver, completely or to a lesser degree, or the vehicle 30 may be nonautonomous. The vehicle 30 includes a propulsion, which may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion.

Figure 2:
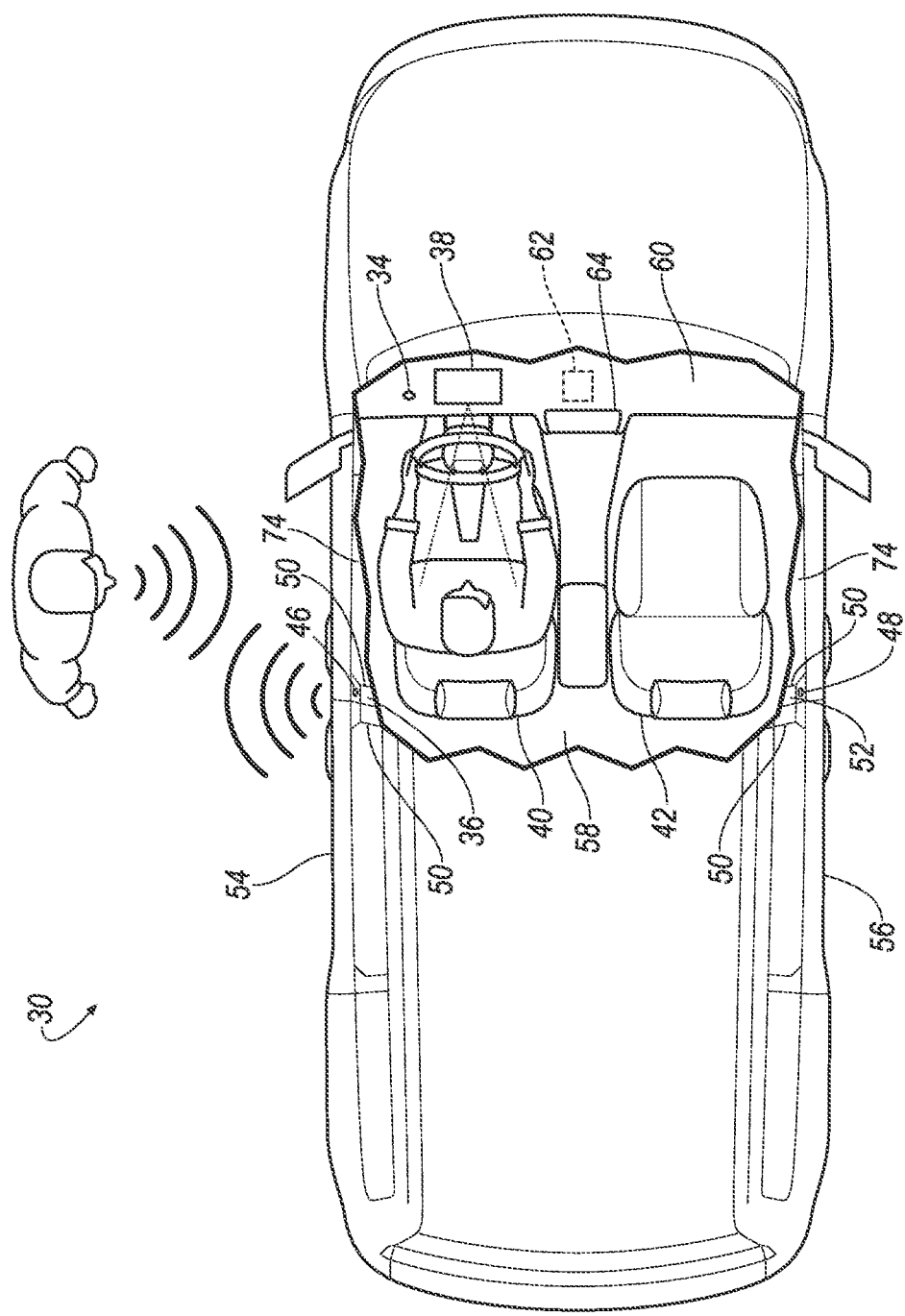
FIG. 2 is a top view of the vehicle with a passenger cabin exposed for illustration.

A first external microphone 46 and a second external microphone 48 are mounted outside the passenger cabin 58 of the vehicle 30, e.g., attached to outward-facing components of the vehicle 30. The external microphones 46, 48 are directed outside the vehicle 30, i.e., oriented to detect sounds originating from sources spaced from the vehicle 30. For example, as shown in FIGS. 1 and 2, the external microphones 46, 48 are mounted to and are possibly part of door panels 50 directly outboard of B pillars of the vehicle 30. The first external microphone 46 is mounted on a first side 54 of the vehicle 30, and the second external microphone 48 is mounted on a second side 56 of the vehicle 30. As shown in FIGS. 1 and 2, the first external microphone 46 is mounted on the left side of the vehicle 30, which is the driver side of the vehicle 30 as shown in the Figures, and the second external microphone 48 is mounted on the right side of the vehicle 30, which is the passenger side of the vehicle 30 as shown in the Figures.

The external microphones 46, 48 are transducers that convert sound into electrical signals. The external microphones 46, 48 can be any suitable type for receiving sound from a pedestrian talking outside the vehicle 30, e.g., a dynamic microphone, a condenser microphone, a piezoelectric microphone, a transducer-on-glass microphone, a transducer-on-trim microphone, etc. If the external microphones 46, 48 are transducer-on-trim microphones, the external microphones 46, 48 are part of the door panels 50.

The first external speaker 36 and a second external speaker 52 are mounted outside the passenger cabin 58 of the vehicle 30, e.g., attached to outward-facing components of the vehicle 30. The external speakers 36, 52 are directed outside the vehicle 30, i.e., oriented to project sound away from the vehicle 30. For example, as shown in FIGS. 1 and 2, the external speakers 36, 52 are mounted to door panels 50 directly outboard of B pillars of the vehicle 30. The first external speaker 36 is mounted to the first side 54 of the vehicle 30, and the second external speaker 52 is mounted to the second side 56 of the vehicle 30. As shown in FIGS. 1 and 2, the first external speaker 36 is mounted to the left side of the vehicle 30, and the second external speaker 52 is mounted to the right side of the vehicle 30.

The external speakers 36, 52 can be any suitable type of speaker audible to a pedestrian relatively close to the vehicle 30. In particular, the external speakers 36, 52 can be panel exciters, i.e., which generate sound by vibrating a rigid panel. For example, an electric motor can be adhered to an inboard side of the door panels 50 and impart vibrations to the door panel 50 to generate sound. An advantage of the external speakers 36, 52 being panel exciters rather than point microphones is that it is more difficult for environmental factors to interfere with performance of the external speakers 36, 52. A single piece of debris (e.g., dirt, mud, ice, snow) or a pedestrian applying pressure with their finger can significantly block or attenuate sound from a point speaker but not from a panel exciter.

With reference to FIG. 2, the vehicle 30 includes the passenger cabin 58 to house occupants, if any, of the vehicle 30. The passenger cabin 58 includes a first seat 40 and a second seat 42 disposed at a front of the passenger cabin 58 and one or more back seats (not shown) disposed behind the first seat 40 and second seat 42. For example, if the vehicle 30 is nonautonomous or less-than-fully autonomous, the driver seat 40 can be a driver seat, and the second seat 42 can be a passenger seat. The passenger cabin 58 may also include third-row seats (not shown) at a rear of the passenger cabin 58. In FIG. 1, the seats 40, 42 are shown to be bucket seats, but the seats 40, 42 may be other types. The position and orientation of the seats 40, 42 and components thereof may be adjustable by an occupant.

The internal microphone 34 is mounted inside the vehicle 30, e.g., in the passenger cabin 58. For example, as shown in FIG. 2, the internal microphone 34 is mounted to an instrument panel 60. The internal microphone 34 is a transducer that converts sound into an electrical signal. The internal microphone 34 can be any suitable type for receiving sound from an occupant of the vehicle 30, e.g., a dynamic microphone, a condenser microphone, a piezoelectric microphone, an exciter-panel microphone, etc.

Internal speakers 62 are mounted inside the vehicle 30, e.g., in the passenger cabin 58. For example, as shown in FIG. 2, the internal speakers 62 are mounted to the instrument panel 60. The internal speakers 62 can be part of an audio infotainment system 64, described below. The internal speakers 62 can be any suitable type of speaker for outputting sound to occupants of the passenger cabin 58, e.g., dynamic loudspeakers.

The camera 38 is positioned so that the field of view of the camera 38 encompasses at least one of the seats 40, 42, e.g., the first seat 40. For example, the camera 38 can be mounted to the instrument panel 60 directly forward of the first seat 40 and face rearward. The camera 38 can be any suitable type for discerning motion of the occupant, e.g., visible-light, infrared, thermal, etc.

The audio infotainment system 64 presents information to and receives information from an occupant of the vehicle 30. The audio infotainment system 64 may be located, e.g., on the instrument panel 60 in the passenger cabin 58, or wherever the audio infotainment system 64 may be readily seen by the occupant. The audio infotainment system 64 may include dials, digital readouts, screens, speakers, and so on for providing information or entertainment to the occupant, e.g., human-machine interface (HMI) elements such as are known. The audio infotainment system 64 includes input sources such as a radio, CD player, auxiliary jack, and/or wired or wireless streaming via a mobile-device input 66 (described below). The audio infotainment system 64 may include buttons, knobs, keypads, a touchscreen, microphone, and so on for receiving information from the occupant.

Figure 3:
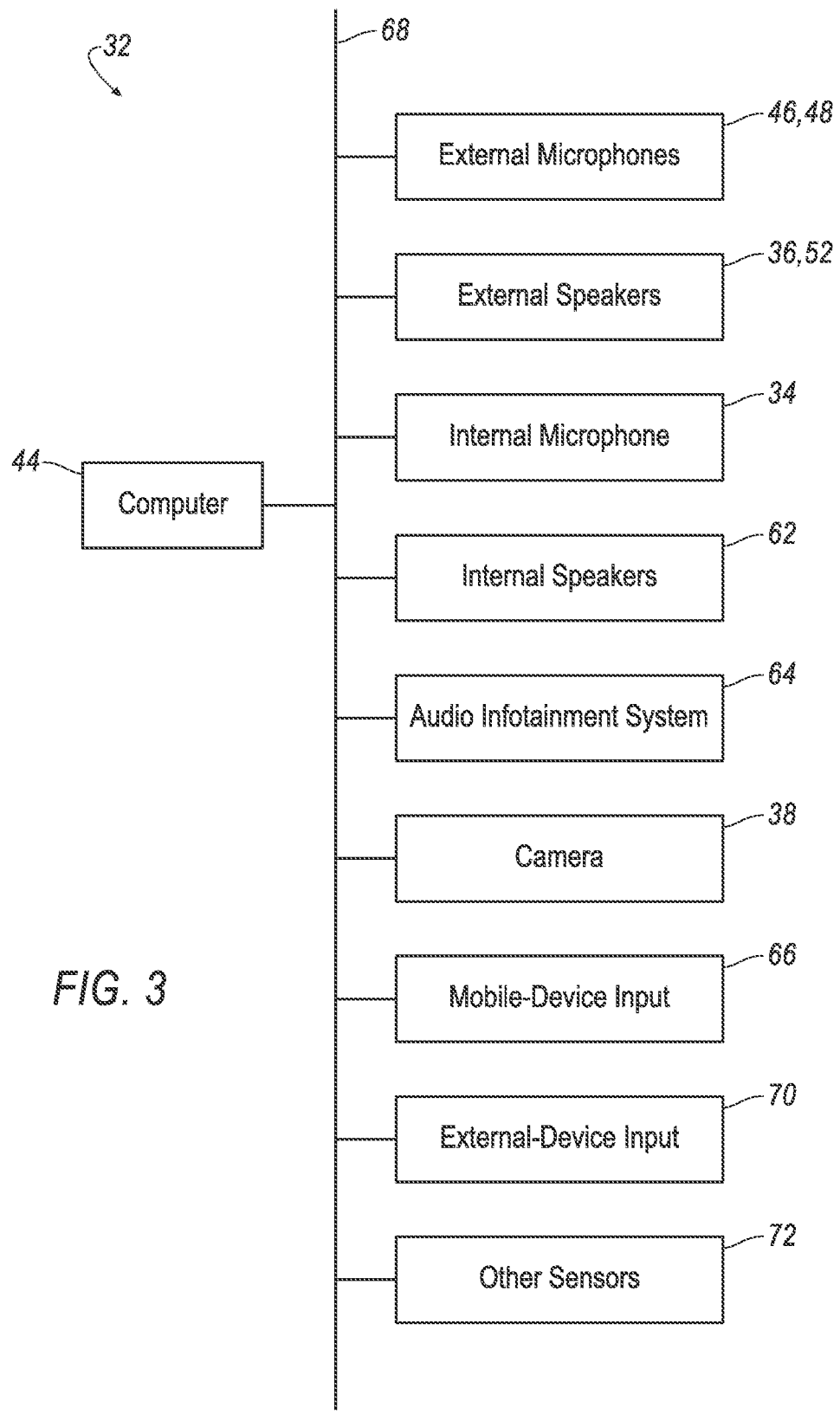
FIG. 3 is a block diagram of a control system for a speaker system of the vehicle.

With reference to FIG. 3, the system 32 includes the computer 44. The computer 44 is a microprocessor-based controller. The computer 44 includes a processor, a memory, etc. The memory of the computer 44 includes media for storing instructions executable by the processor as well as for electronically storing data and/or databases.

The computer 44 may transmit and receive data through a communications network 68 such as a controller area network (CAN) bus, Ethernet, Bluetooth®, WiFi, Ultra-Wide Band (UWB), Local Interconnect Network (LIN), onboard diagnostics connector (OBD-II), and/or by any other wired or wireless communications network. The computer 44 may be communicatively coupled to the external microphones 46, 48, the external speakers 36, 52, the internal microphone 34, the internal speakers 62, the audio infotainment system 64, the camera 38, the mobile-device input 66, an external-device input 70, other sensors 72, and other components via the communications network 68.

The mobile-device input 66 transfers input between the computer 44 and a mobile device of an occupant of the vehicle 30. The mobile-device input 66 can be a port for a wired connection, e.g., an auxiliary connection plugged into the mobile device and into the vehicle 30, e.g., the instrument panel 60. The mobile-device input 66 can be a transceiver for a wireless connection, e.g., wireless local area connection such as Wi-Fi (described in the IEEE 802.11 standards), BLUETOOTH Low Energy (BLE), or UWB.

The external-device input 70 transfers input between the computer 44 and a transmitting device external to the vehicle 30. The external-device input 70 can be a transceiver for a wireless connection, e.g., wireless local area connection such as Wi-Fi, BLE, or UWB.

The vehicle 30 includes other sensors 72. The other sensors 72 may provide data about operation of the vehicle 30, for example, vehicle speed, wheel speed, wheel orientation, and engine and transmission data (e.g., temperature, fuel consumption, etc.). The sensors may detect the location and/or orientation of the vehicle 30. For example, the sensors may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors may detect the external world, e.g., objects and/or characteristics of surroundings of the vehicle 30, such as other vehicles, road lane markings, traffic lights and/or signs, pedestrians, etc. For example, the sensors may include radar sensors, ultrasonic sensors, scanning laser range finders, light detection and ranging (LIDAR) devices, thermal imaging sensors, and image processing sensors such as cameras.

Figure 4:
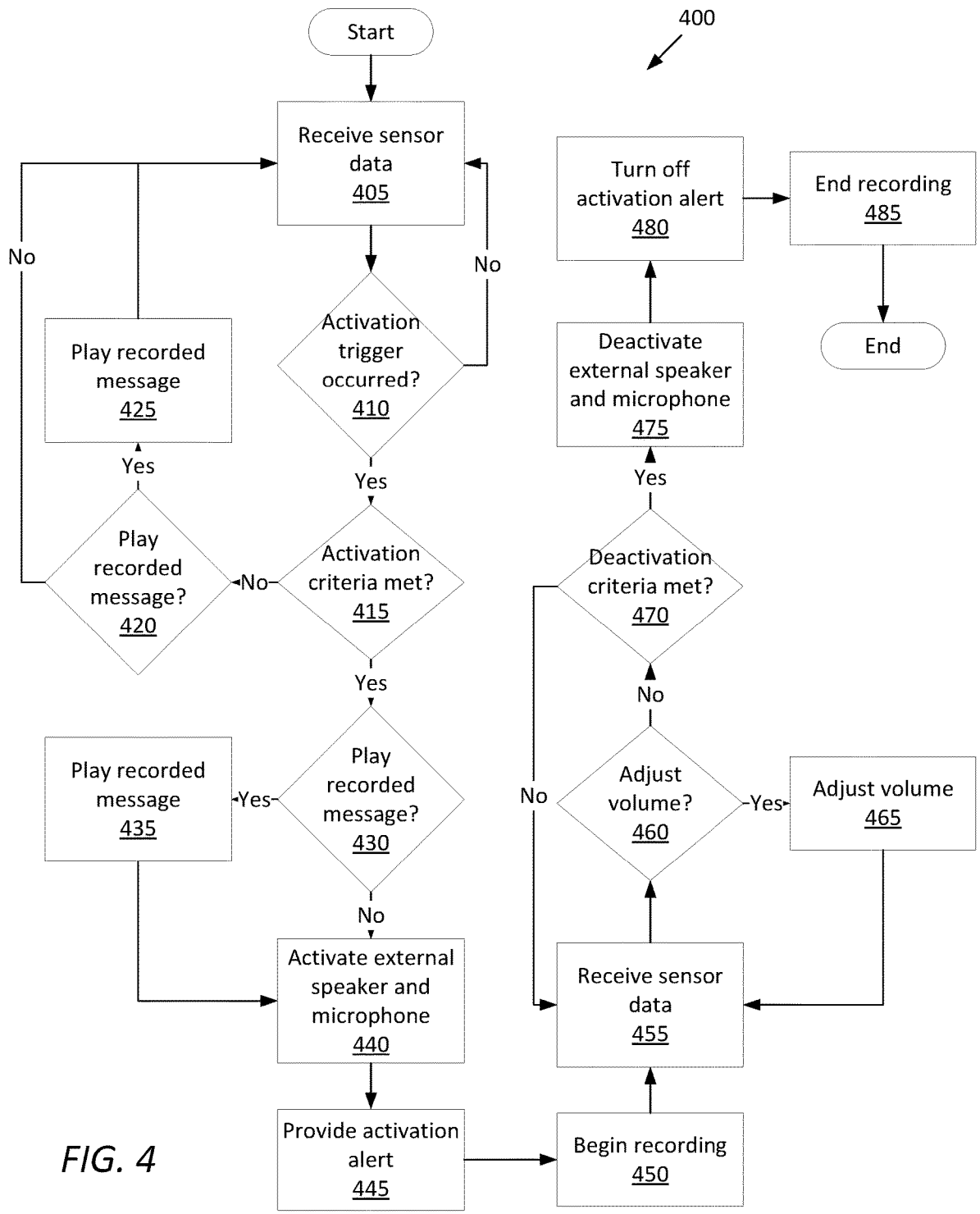
FIG. 4 is a process flow diagram of an example process for controlling the speaker system.

FIG. 4 is a process flow diagram illustrating an exemplary process 400 for controlling the external speakers 36, 52. The memory of the computer 44 stores executable instructions for performing the steps of the process 400. As a general overview of the process 400, the computer 44 activates the external speakers 36, 52 and external microphones 46, 48 in response to an activation trigger such as a first gesture by the occupant of the first seat 40, and deactivates the external speakers 36, 52 and external microphones 46, 48 in response to a deactivation trigger. (The description below of the process 400 references the occupant of the first seat 40, but the process 400 can also be performed with reference to an occupant of the second seat 42 or another seat in the vehicle 30.)

The process 400 begins in a block 405, in which the computer 44 receives sensor data, e.g., image data from the camera 38, location data from a GPS sensor of the other sensors 72, and data from the external-device input 70. The image data are a sequence of image frames of the field of view of the camera 38. Each image frame is a two-dimensional matrix of pixels. Each pixel has a brightness or color represented as one or more numerical values, depending on the type of camera 38. For example, if the camera 38 is a monochrome camera, each pixel can be a scalar unitless value of photometric light intensity between 0 (black) and 1 (white). For another example, if the camera 38 is a full-color camera, the pixels can be values for each of red, green, and blue, e.g., each on an 8-bit scale (0 to 255) or a 12- or 16-bit scale. Position in an image frame, i.e., position in the field of view of the camera 38 at the time that the image frame was recorded, can be specified in pixel dimensions or coordinates, e.g., an ordered pair of pixel distances, such as a number of pixels from a top edge and a number of pixels from a left edge of the field of view. The location data are, e.g., GPS or local coordinates. The data from the external-device input 70 can include messages from a device outside the vehicle 30.

Next, in a decision block 410, the computer 44 determines whether an activation trigger has occurred. The activation trigger can be a first gesture from the occupant of the first seat 40, the vehicle 30 being at a prestored location, or receiving a vehicle-to-infrastructure (V2I) message, as all described below. The computer 44 can use all or a subset of the activation triggers described below. If none of the activation triggers has occurred, the process 400 returns to the block 405 to continue monitoring sensor data. If one of the activation triggers has occurred, the process 400 proceeds to a decision block 415.

A first activation trigger can be a first gesture by the occupant of the first seat 40, as just mentioned. The first gesture can be a turning of a head of the occupant sideways, i.e., turning the head left and/or right, i.e., toward the first side 54 and/or second side 56 of the vehicle 30. For another example, the first gesture can be the occupant turning their head sideways while also moving their mouth. The computer 44 can identify the first gesture using conventional image-recognition techniques, e.g., a convolutional neural network programmed to accept images as input and to output an identified gesture. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential gesture, and the final output is the gesture with the highest score. The computer 44 may treat turning the head toward the first side 54 of the vehicle 30 as the first gesture and turning the head toward the second side 56 of the vehicle 30 as a second gesture, both of which are activation triggers, and the computer 44 may store which of the first or second gesture occurred for use in a block 440 below.

A second activation trigger is the vehicle 30 being at a prestored location. The prestored location is stored as location data in the memory of the computer 44. The computer 44 compares the location data received from the other sensors 72 with the prestored location; if the location of the vehicle 30 is within a threshold distance of the prestored location, then the vehicle 30 is at the prestored location. The threshold distance is chosen to encompass a typical distance to park the vehicle 30 from the prestored location, which can depend on the type of prestored location. For example, if the prestored location is a security gate, then the threshold distance is chosen to include the vehicle 30 when the vehicle 30 is parked adjacent the security gate.

A third activation trigger is receiving a V2I message, e.g., from a BLE beacon or other beacon. For example, the external-device input 70 may receive a message from an infrastructure component such as a toll booth that the vehicle 30 is in range of the infrastructure component. For another example, the computer 44 may determine that the vehicle 30 is within range of the infrastructure component based on a signal strength of the V2I message, i.e., the signal strength being above a signal-strength threshold. The signal strength decays at a known quantity versus distance, and the signal-strength threshold may be chosen similarly to the threshold distance of the second activation trigger above. Alternatively, the external-device input 70 may receive a message from an infrastructure component such as a toll booth over UWB allowing the vehicle 30 to assess that the vehicle 30 is in range of the infrastructure component based on a time-of-flight (ToF) distance calculation from measuring the round-trip time (RTT).

A fourth activation trigger is an input from the occupant received through the audio infotainment system 64. For example, the occupant may push a button, execute a touchscreen command, or speak a command aloud that is stored in the memory of the computer 44 and associated with activating the external speakers 36, 52.

In the decision block 415, the computer 44 determines whether activation criteria are met. The activation criteria can be one or more of a noise level above a threshold noise level, a speed below a threshold speed, an object within a threshold distance, no ongoing telephone calls, the occupant of the first seat 40 not holding a mobile device (or no occupant of the seats 40, 42 holding a mobile device), the audio infotainment system 64 not playing an input source, and/or no occupants in the vehicle 30 other than the occupant in the first seat 40. The computer 44 may test all or a subset of the activation criteria described below. If one of the activation criteria is not met, the process 400 proceeds to a decision block 420. If the activation criteria are all met, the process 400 proceeds to a decision block 430.

A first possible activation criterion is a noise level, as indicated by data from the internal microphone 34, that is above a threshold noise level. The noise level and threshold noise level can be volumes measured in decibels. The threshold noise level can be chosen to pick up a typical speaking voice but not typical background noise, i.e., to be far enough above a typical background noise level to avoid false positives and far enough below a typical speaking voice to avoid false negatives.

A second possible activation criterion is a speed of the vehicle 30 being below a threshold speed. The speed and the threshold speed can be measured in distance per time, e.g., miles per hour. The threshold speed can be chosen to be sufficiently slow that the occupant could be plausibly attempting a conversation, e.g., 3 miles per hour.

A third possible activation criterion is an object, e.g., a pedestrian, within a threshold distance of the vehicle 30. The computer 44 can determine the distance of the object from the vehicle 30 using data from, e.g., radar sensors, ultrasonic sensors, and/or LIDAR sensors of the other sensors 72. The computer 44 can identify whether an object is, e.g., a pedestrian by using conventional image-recognition techniques such as a convolutional neural network, as described above.

A fourth possible activation criterion is an ongoing telephone call. The mobile-device input 66 can send a message to the computer 44 indicating that a telephone call is occurring based on data received from the mobile device of the occupant. The fourth activation criterion is met so long as no telephone calls are occurring.

A fifth activation criterion is whether the occupant is (or any of the occupants are) holding a mobile device such as a cellular phone. The computer 44 determines whether the occupant is holding a mobile phone from data provided by the camera 38 by using conventional image-recognition techniques such as a convolutional neural network, as described above. The fifth activation criterion is met if the occupant of the first seat 40 is not holding a mobile device.

A sixth possible activation criterion is whether the audio infotainment system 64 is playing an input source, e.g., a radio, a compact disc, media stored on a mobile device connected to the audio infotainment system 64, etc. The audio infotainment system 64 can send a message to the computer 44 indicating that an input source is currently playing. The sixth activation criterion is met so long as the audio infotainment system 64 is not playing any input sources.

A seventh possible activation criterion is the presence of any occupants in the vehicle 30 other than the occupant in the first seat 40. The computer 44 may use conventional image-recognition techniques with data from the camera 38 or other internal cameras, receive data from weight sensors in the seats 40, 42, and/or receive data from sensors detecting whether seatbelts for the seats 40, 42 are buckled or spooled. The seventh activation criterion is met so long as the occupant of the first seat 40 is the only occupant in the passenger cabin 58.

An eighth possible activation criterion is whether a biometric characteristic of a pedestrian outside the vehicle 30 (e.g., as identified in the third activation criterion above) matches a stored biometric characteristic, e.g., in a biometric database. The eighth activation criterion can be satisfied by the biometric characteristic of the pedestrian matching a stored biometric characteristic or failing to match any of a plurality of stored biometric characteristics, e.g., in a biometric database. For the purposes of this disclosure, "biometric characteristic" means a human trait that uniquely or virtually uniquely identifies an individual. Biometric characteristics can include faces, fingerprints, speech patterns, etc. The computer 44 may use conventional facial-recognition techniques with data from cameras of the other sensors 72 to identify the face in the data and compare the face with a particular stored face or with faces in one or more facial-recognition databases. The computer 44 may use conventional fingerprint-recognition techniques with data from a fingerprint reader of the other sensors 72 to identify the fingerprint in the data and compare the fingerprint with a particular stored fingerprint or with fingerprints in one or more fingerprint-recognition databases. The computer 44 may use conventional biometric speech-analysis techniques with data from the external microphones 46, 48 to compare the speech pattern of the pedestrian with speech patterns in one or more speech-recognition databases. For example, the computer 44 can compare the biometric characteristic of the pedestrian with a biometric characteristic of a customer who is waiting for a scheduled ride from a ride-hailing service for which the vehicle 30 operates. The pedestrian may have earlier provided the biometric characteristic through an app associated with the ride-hailing service. For another example, the biometric database can include one or more of the biometric characteristics for all customers of the ride-hailing service for which the vehicle 30 operates. The eighth activation criterion is then satisfied if the biometric characteristic of the pedestrian is present in the biometric database. For another example, the biometric database can be a criminal database. The eighth activation criterion is then satisfied if the biometric characteristic of the pedestrian is absent from the biometric database, i.e., the computer 44 fails to match the biometric characteristic of the pedestrian with any biometric characteristics in the criminal biometric database. Regardless of whether the eighth activation criterion is satisfied, the computer 44 can store the biometric characteristic of the pedestrian for future reference or investigation.

A ninth possible activation criterion is whether statistical data associated with the location of the vehicle 30 exceeds a threshold. The location can be supplied to the computer 44 from, e.g., a GPS sensor of the other sensors 72. The threshold can be chosen based on the type of statistical data. The statistical data is sorted by geographical area. For example, the statistical data can be the number of crimes (or the number of a specific crime such as carjacking) reported in a geographical region encompassing the location of the vehicle 30. The ninth activation criterion is satisfied if the number of, e.g., crimes is below the threshold.

A tenth possible activation criterion is whether a temperature of a pedestrian outside the vehicle 30 (e.g., as identified in the third activation criterion above) is below a temperature threshold. The temperature of the pedestrian can be supplied to the computer 44 by a thermal image sensor of the other sensors 72. If a thermal image contains multiple temperatures associated with different parts of the pedestrian, the computer 44 can use the highest associated temperature. The temperature threshold can be chosen to indicate that the pedestrian likely has an elevated body temperature, i.e., is running a fever, such as from being infected with a pathogen. The tenth possible activation criterion is satisfied when the temperature of the pedestrian is below the temperature threshold (meaning that the computer 44 prevents the external speakers 36, 52 from activating when the temperature of the pedestrian is above the threshold).

An eleventh possible activation criterion is determining that a feature status of a mobile device of a pedestrian outside the vehicle 30 (e.g., as identified in the third activation criterion above) matches criteria stored in the memory of the computer 44. For the purposes of this disclosure, a "feature status" specifies whether a transmitting feature of the mobile device is active or inactive, and a "transmitting feature" is a feature of the mobile device that affects transmission by the mobile device, e.g., cellular service, Bluetooth®, UWB, GPS, airplane mode, etc. The computer 44 may receive the feature status of the mobile device from the external-device input 70, either based on communication between the mobile device and the external-device input 70 or on communication to an infrastructure component connected to a remote server, e.g., the internet. For example, the external-device input 70 may directly receive Bluetooth®, UWB, and/or cellular signals from the mobile device. The status of the GPS of the mobile device may be received via an app for a ride-hailing service for which the vehicle 30 is operating. The remote server can receive a status of the GPS via the app, and then communicate that status to the computer via the external-device input 70. The criteria for the feature status may be chosen to indicate a likelihood that the pedestrian is attempting to evade tracking. For example, the stored criteria may be that the GPS of the mobile device is inactive, or that the Bluetooth® or UWB service of the mobile device is active and at the same time the cellular service of the mobile device is inactive.

In the decision block 420, the computer 44 determines whether to instruct the external speakers 36, 52 to play a message stored in the memory of the computer 44. Whether to play a recorded message can be linked to the resolution of one or more of the activation triggers from the decision block 410 and/or to the resolution of one or more of the activation criteria from the decision block 415. Specifically, whether to play a recorded message can depend on which of the activation criteria were not satisfied in the decision block 415. For example, if the activation criteria involved a determination with respect to a pedestrian outside the vehicle 30, i.e., the eighth, tenth, or eleventh criteria not being satisfied, then the computer 44 determines to play a recorded message to the pedestrian. If the computer 44 determines to play a recorded message, the process 400 proceeds to a block 425. If the computer 44 determines not to play a recorded message, the process 400 returns to the block 405 to continue monitoring sensor data.

In the block 425, the computer 44 instructs the external speakers 36, 52 to play a message stored in the memory of the computer 44. For example, the recorded message can be "out of service," "awaiting reserved ride," etc.

In the decision block 430, the computer 44 determines whether to instruct the external speakers 36, 52 to play a message stored in the memory of the computer 44. Whether to play a recorded message can be linked to the resolution of one or more of the activation triggers from the decision block 410 and/or to the resolution of one or more of the activation criteria from the decision block 415. For example, whether to play a recorded message can be dependent on one of the second or third activation triggers being satisfied. If the computer 44 determines to play a recorded message, the process 400 proceeds to a block 435. If the computer 44 determines not to play a recorded message, the process 400 proceeds to the block 440.

In the block 435, computer 44 instructs the external speakers 36, 52 to play a message stored in the memory of the computer 44. For example, the recorded message can be associated with the particular prestored location that satisfied the second activation trigger or the particular V2I message that satisfied the third activation trigger, e.g., a personalized greeting.

In the block 440, the computer 44 activates one or both of the external speakers 36, 52 to broadcast based on data transmitted by the internal microphone 34, i.e., to produce the sound that the internal microphone 34 hears (possibly subjected to preprocessing, as is known). If the activation trigger was the first or second gesture, then the computer 44 may activate the first external speaker 36 if the gesture was turning the head of the occupant to the first side 54, and the computer 44 may activate the second external speaker 52 if the gesture was turning the head to the second side 56. For another example, the computer 44 may activate the one of the external speakers 36, 52 closer to a side of the street on which the vehicle 30 is parked, e.g., for the vehicle 30 as shown in FIG. 2, the first external speaker 36 if the vehicle 30 is parked on the left side of the street, and the second external speaker 52 if the vehicle 30 is parked on the right side of the street. The computer 44 may use data from the GPS sensor of the other sensors 72 to determine which side of the street the vehicle 30 is parked on. For another example, the computer 44 may use both the first or second gesture and the side of the street on which the vehicle 30 is parked to select which one of the external speakers 36, 52 to activate, e.g., by adjusting a confidence interval for interpreting the first or second gesture (as described with respect to the decision block 410) based on which side of the street the vehicle 30 is parked on. The computer 44 also activates the external microphones 46, 48. For example, the computer 44 may activate the external microphone 46, 48 on the same side of the vehicle 30 as the activated external speaker 36, 52. The internal speakers 62 broadcast to the passenger cabin 58 based on data transmitted by the external microphones 46, 48. The occupant of the first seat 40 can now have a conversation with a pedestrian outside the vehicle 30.

Next, in a block 445, the computer 44 provides an activation alert to the occupant. For example, the computer 44 may illuminate a lamp on the instrument panel 60, side-view mirror, etc. If the lamp is located on the side-view mirror, then the lamp may be visible to both the occupant and to a person outside the vehicle 30 to whom the occupant is speaking. For another example, the computer 44 may display a visual message on the audio infotainment system 64. For yet another example, the computer 44 may instruct the internal speakers 62 to produce a sound associated with activation of the external speakers 36, 52, e.g., a chime. The computer 44 may also modify a volume of media being played by the audio infotainment system 64, such as decreasing the volume of the media to a preset low level, turning the media off (i.e., turning the volume to zero), decreasing the volume of one or a subset of aspects of the media to zero or a preset low level, in particular voice audio in the media (e.g., when the media is a song, muting the singing in the song without muting the instrumentation).

Next, in a block 450, the computer 44 begins recording the conversation, i.e., recording in memory the sounds detected by the internal microphone 34 and by the activated external microphones 46, 48. Recording the conversation may occur only in jurisdictions in which such recordings are permissible. Alternatively, the computer 44 can begin recording video as well as audio, using the camera 38 and/or external cameras of the other sensors 72 in addition to the internal microphone 34 and the activated external microphones 46, 48. The computer 44 continues recording until a block 485 below. Alternatively or additionally, the computer 44 can store a wireless ID (such as a Bluetooth® ID or a Wi-Fi ID) of a mobile device of the pedestrian, which the computer 44 can receive via, e.g., the external-device input 70.

Next, in a block 455, the computer 44 receives sensor data, as described above with respect to the block 405.

Next, in a decision block 460, the computer 44 determines whether to adjust the volume of the activated external speakers 36, 52. The computer 44 determines whether any volume-adjustment criteria have been met. Volume-adjustment criteria include a third gesture from the occupant of the first seat 40, a preprogrammed timed volume adjustment, and a change in external background noise, as described below. The computer 44 can use all or a subset of the volume-adjustment criteria described below. In response to one of the volume-adjustment criteria being met, the process 400 proceeds to a block 465. In response to none of the volume-adjustment criteria being met, the process 400 proceeds to a block 470.

A first volume-adjustment criterion is a third gesture from the occupant of the first seat 40. For example, the third gesture can be the occupant nodding their head up or down. The computer 44 can identify the third gesture using conventional image-recognition techniques such as using a convolutional neural network, as described above with respect to the decision block 410. The computer 44 can store whether the head nod was up or down for use in the block 465.

A second volume-adjustment criterion is a time duration since activating the external speakers 36, 52 in the block 440. For example, the memory of the computer 44 stores a predetermined duration, and the volume is adjusted once that predetermined duration has elapsed.

A third volume-adjustment criterion is a difference between a volume level of the external speakers 36, 52 and an external background noise level being above or below a threshold (depending on whether the volume level of the external speakers 36, 52 is above or below the external background noise). The external background noise level is detected by the external microphones 46, 48. The external background noise level can be tracked as a running average of the noise level reported by the external microphones 46, 48, e.g., an average of the noise level reported by the external microphones 46, 48 over the previous 5 or 10 seconds. The threshold can be determined experimentally, e.g., by surveying pedestrians on how easily they can hear the external speakers 36, 52 at different volume levels and external background noise levels. For example, the threshold might be approximately 20 dB signal-to-noise ratio (SNR).

In the block 465, the computer 44 adjusts the volume of the external speakers 36, 52, i.e., increases or decreases the volume of the external speakers 36, 52. For the first volume-adjustment criterion, the computer 44 increases the volume of the external speakers 36, 52 if, e.g., the occupant nodded their head up, and the computer 44 decreases the volume of the external speakers 36, 52 if, e.g., the occupant nodded their head down. For the second volume-adjustment criterion, the volume is adjusted to a first volume level before the predetermined duration and adjusted to a second volume level different from the first volume level after the predetermined duration. The first volume level can be louder than the second volume level in order to, e.g., get a pedestrian's attention. For the third volume-adjustment criterion, the computer 44 increases the volume of the external speakers 36, 52 if the external background noise has increased enough for the difference to exceed or fall below the threshold, and the computer 44 decreases the volume of the external speakers 36, 52 if the external background noise has decreased enough for the difference to exceed or fall below the threshold. After the block 465, the process 400 returns to the block 455 to continue monitoring the sensor data for adjustments to the volume of the external speakers 36, 52.

In the block 470, the computer 44 determines whether deactivation criteria are met. The deactivation criteria can be a fourth gesture from the occupant of the first seat 40, a predetermined duration of silence from the occupant, motion of the vehicle 30, an increase to the volume of the audio infotainment system 64, or rolling down a window 74 of the vehicle 30. The computer 44 can use all or a subset of the deactivation criteria described below. If none of the deactivation criteria are met, the process 400 returns to the block 455 to continue monitoring the sensor data for adjustments to the volume of the external speakers 36, 52. If one of the deactivation criteria is met, the process 400 proceeds to a block 475.

A first deactivation criterion is a fourth gesture from the occupant of the first seat 40 occurring for a threshold time. The fourth gesture can be looking forward. Alternatively, the fourth gesture can be looking forward or looking toward the side 54, 56 of the vehicle 30 on which the external speaker 36, 52 is not activated, i.e., looking away from the side 54, 56 of the vehicle 30 on which the external speaker 36, 52 is activated. The threshold time can be chosen to be sufficiently long as to indicate that the conversation has ended, e.g., 10 seconds.

A second deactivation criterion is a noise level detected by the internal microphone 34 being below a threshold noise level or noise levels detected by both the internal microphone 34 and the activated external microphones 46, 48 being below respective threshold noise levels. The threshold noise levels can be chosen to be slightly higher than an upper end of the (internal or external) background noise level.

A third deactivation criterion is at least one of a speed of the vehicle 30 exceeding a speed threshold or a turn of the vehicle 30 exceeding an angular threshold. The speed threshold and angular threshold can each be chosen to be sufficiently high as to indicate an intent by the occupant to leave the area at which the vehicle 30 is located, e.g., a speed of more than 4 miles per hour or an angle of more than 30°.

A fourth deactivation criterion is an occupant increasing a volume of the audio infotainment system 64, e.g., by turning a dial or pressing a button of the audio infotainment system 64.

A fifth deactivation criterion is an occupant rolling down one of the windows 74 of the vehicle 30, e.g., the window 74 lateral from the first seat 40 on the side 54, 56 of the vehicle 30 on which the external speaker 36, 52 is activated.

In the block 475, the computer 44 deactivates the external speakers 36, 52 and the external microphones 46, 48, ending the conversation.

Next, in a block 480, the computer 44 turns off the activation alert that had been activated in the block 445, e.g., turning off the lamp or removing the message from the display screen. The computer 44 may also instruct the internal speakers 62 to produce a sound associated with deactivation of the external speakers 36, 52, e.g., a chime different than the chime produced in the block 445 above.

Next, in a block 485, the computer 44 ends the recording begun in the block 450. The computer 44 can store an audio or audiovisual file of the conversation in the memory of the computer 44, transmit the file to memo in a cloud-service delivery network, and/or transmit the file to an account associated with the occupant or owner of the vehicle 30. After the block 485, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," "third," and "fourth" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing processor-executable instructions to:
    in response to data from a camera with a field of view encompassing a seat in a passenger cabin of a vehicle indicating a gesture by an occupant of the seat, activate a speaker mounted outside the passenger cabin and directed outside the vehicle to broadcast based on data transmitted by a microphone mounted inside the vehicle; and
    prevent the speaker from activating in response to data indicating that a biometric characteristic of a pedestrian outside the vehicle fails to match any of a plurality of stored biometric characteristics.

2. The computer of claim 1, wherein the instructions further include to store the biometric characteristic of the pedestrian in the memory.

3. The computer of claim 1, wherein the instructions further include to instruct the speaker to play a recorded message in response to the data indicating that the biometric characteristic of the pedestrian fails to match any of the plurality of stored biometric characteristics.

4. The computer of claim 1, wherein the biometric characteristic is one of a face, a fingerprint, or a speech pattern.

5. The computer of claim 1, wherein the instructions further include to provide an activation alert upon activating the speaker.

6. The computer of claim 1, wherein the instructions further include to, in response to an input from an audio infotainment system of the vehicle, activate the speaker to broadcast based on the data transmitted by the microphone.

7. The computer of claim 1, wherein the instructions further include to deactivate the speaker in response to data indicating rolling down a window of the vehicle.

8. The computer of claim 1, wherein the instructions further include to deactivate the speaker in response to data indicating increasing a volume of an audio infotainment system of the vehicle.

9. The computer of claim 1, wherein the instructions further include to, in response to receiving a V2I message from a source outside the vehicle, activate the speaker to broadcast based on the data transmitted by the microphone.

10. The computer of claim 1, wherein the instructions further include to decrease a volume of all or a subpart of media being played by an audio infotainment system of the vehicle upon activating the speaker.

11. The computer of claim 1, wherein the instructions further include to adjust a volume level of the speaker based on a difference between the volume level and an external background noise level.

12. The computer of claim 1, wherein the microphone is a first microphone, and the instructions further include to, while the speaker is activated, record sounds detected by the first microphone and detected by a second microphone mounted outside the passenger cabin.

13. The computer of claim 1, wherein the instructions further include to prevent the speaker from activating in response to statistical data associated with a location of the vehicle exceeding a threshold.

14. The computer of claim 1, wherein the instructions further include to store a wireless ID of a mobile device of the pedestrian outside the vehicle upon activating the speaker.

15. The computer of claim 1, wherein the instructions further include to prevent the speaker from activating upon determining that a feature status of a feature of a mobile device of the pedestrian outside the vehicle matches criteria stored in the memory.

16. The computer of claim 15, wherein the feature is at least one of cellular service, Bluetooth®, Ultra-Wide Band (UWB), or GPS.

17. The computer of claim 16, wherein the criteria are at least one of (a) the GPS being inactive or (b) the Bluetooth® or UWB being active and the cellular service being inactive.

18. The computer of claim 1, wherein the speaker is a first speaker mounted on a first side of the vehicle, and the instructions further include to activate the first speaker in response to the data from the camera indicating the gesture when the vehicle is closer to a side of a street on the first side of the vehicle, and to activate a second speaker mounted outside the passenger cabin on a second side of the vehicle opposite the first side and directed outside the vehicle in response to the data from the camera indicating the gesture when the vehicle is closer to a side of the street on the second side of the vehicle.

19. A computer comprising a processor and a memory storing processor-executable instructions to:
    in response to data from a camera with a field of view encompassing a seat in a passenger cabin of a vehicle indicating a gesture by an occupant of the seat, activate a speaker mounted outside the passenger cabin and directed outside the vehicle to broadcast based on data transmitted by a microphone mounted inside the vehicle; and
    prevent the speaker from activating in response to data indicating that a temperature of a pedestrian outside the vehicle is above a temperature threshold.

20. A computer comprising a processor and a memory storing processor-executable instructions to:
- in response to data from a camera with a field of view encompassing a seat in a passenger cabin of a vehicle indicating a gesture by an occupant of the seat, activate a speaker mounted outside the passenger cabin and directed outside the vehicle to broadcast based on data transmitted by a microphone mounted inside the vehicle;
- in response to location data indicating that the vehicle is at a prestored location, activate the speaker to broadcast based on data transmitted by the microphone; and
- in response to the location data, instruct the speaker to play a recorded message associated with the prestored location.

* * * * *